US012094402B2

(12) United States Patent
Ichikura

(10) Patent No.: US 12,094,402 B2
(45) Date of Patent: Sep. 17, 2024

(54) DISPLAY DRIVING DEVICE

(71) Applicant: LAPIS Semiconductor Co., Ltd., Yokohama (JP)

(72) Inventor: Hiroyoshi Ichikura, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 71 days.

(21) Appl. No.: 17/442,211

(22) PCT Filed: Mar. 30, 2020

(86) PCT No.: PCT/JP2020/014570
§ 371 (c)(1),
(2) Date: Sep. 23, 2021

(87) PCT Pub. No.: WO2020/203974
PCT Pub. Date: Oct. 8, 2020

(65) Prior Publication Data
US 2022/0172675 A1 Jun. 2, 2022

(30) Foreign Application Priority Data
Mar. 29, 2019 (JP) ................................ 2019-066090

(51) Int. Cl.
*G09G 3/3208* (2016.01)

(52) U.S. Cl.
CPC ..... *G09G 3/3208* (2013.01); *G09G 2330/021* (2013.01)

(58) Field of Classification Search
CPC ........... G09G 3/3208; G09G 2330/021; G09G 2330/028
(Continued)

(56) References Cited

U.S. PATENT DOCUMENTS

2003/0052851 A1* 3/2003 Yano .................... G09G 3/2011 345/89
2009/0302683 A1* 12/2009 Wu ........................... H02J 1/08 307/52

(Continued)

FOREIGN PATENT DOCUMENTS

JP 2007-122156 A 5/2007
KR 10-1918212 B1 1/2019
WO 2012/081222 A1 6/2012

*Primary Examiner* — Amare Mengistu
*Assistant Examiner* — Gloryvid Figueroa-Gibson
(74) *Attorney, Agent, or Firm* — Rabin & Berdo, P.C.

(57) ABSTRACT

A display driving device includes a high voltage operating unit obtaining an operating current according to the application of the high power supply voltage from the first voltage application line; a low voltage operating unit that operates according to an application of a low power supply voltage to control the high voltage operating unit; a recycling circuit that receives the operating current from the high voltage operating unit via a relay coupling line and applies the low power supply voltage to the low voltage operating unit while supplying the received operating current to a reference potential line via the low voltage operating unit; and a current bypass circuit that flows a part of the operating current flowing through the relay coupling line into the reference potential line without supplying the part of the operating current to the recycling circuit according to a voltage increase in the low power supply voltage.

6 Claims, 7 Drawing Sheets

(58) Field of Classification Search
USPC ........................................................ 345/204
See application file for complete search history.

(56) References Cited

U.S. PATENT DOCUMENTS

| | | | | |
|---|---|---|---|---|
| 2014/0111497 | A1 | 4/2014 | Choi et al. | |
| 2015/0325200 | A1* | 11/2015 | Rho .................... | G09G 3/3688 345/212 |
| 2019/0279591 | A1* | 9/2019 | Kim .................... | G09G 3/3685 |

* cited by examiner

DISPLAY DRIVING DEVICE

TECHNICAL FIELD

The present invention relates to a display driving device that operates by applying power supply voltages of a plurality of different voltage levels.

BACKGROUND ART

Generally, in accordance with miniaturization of an internal circuit, an operating voltage lowers to, for example, 1.2 V, in a semiconductor device, and thus consumed power is reduced. Since the circuit part is configured as a semiconductor device in a display driving device as well, a logic circuit, such as a control circuit, operates at a low voltage. On the other hand, in an output stage including an output circuit that outputs a driving voltage to a display panel, for example, to generate the driving voltage corresponding to a luminance level of each pixel, a high operating voltage like 7 V is required. A pre-stage circuit, such as an input interface unit of a video signal, operates at a medium operating voltage, for example, 1.8 V. Therefore, all components in the display driving device cannot operate at a single low voltage, and thus reduction in electricity consumption did not proceed.

However, the reduction in electricity consumption is especially required for a recent display driving device used for a mobile device, such as a smartphone, for higher definition display and to avoid frequent charging of a battery as the main power supply.

Patent Document 1 discloses a voltage regulator configured to generate any given one or more voltages from a high voltage. The voltage regulator steps down an external power supply voltage by a first regulator circuit to generate a first power supply voltage and includes a second regulator circuit and a third regulator circuit. The second regulator circuit and the third regulator circuit each operate using the first power supply voltage as a power supply, and step down the external power supply voltage using a voltage drop element, generate a second power supply voltage and a third power supply voltage, respectively, using a driver element for voltage control using the stepped-down voltage as an input voltage to ensure outputting them to individual loads.

Patent Document 1: JP-A-2007-122156

DISCLOSURE OF THE INVENTION

Problems to be Solved by the Invention

However, decreasing the power supply voltage and an operating current for lower electricity consumption in the conventional display driving device causes problems that a desired property cannot be obtained, an operating condition needs to be changed, or in some cases, changing a circuit to obtain the desired property increases a manufacturing cost, and thus reducing the consumed power easily was difficult.

Therefore, an object of the present invention is to provide a display driving device that can effectively reduce consumed power comparatively easily.

Solutions to the Problems

A display driving device for driving a display panel according to the present invention includes a high voltage operating unit that includes an output circuit to supply a driving voltage to the display panel, the high voltage operating unit being coupled to a first voltage application line to which a high power supply voltage is applied, the high voltage operating unit obtaining an operating current according to the application of the high power supply voltage from the first voltage application line; a low voltage operating unit that operates according to an application of a low power supply voltage lower than the high power supply voltage to control the high voltage operating unit; a recycling circuit that receives the operating current from the high voltage operating unit via a relay coupling line, the recycling circuit applying the low power supply voltage to the low voltage operating unit while supplying the received operating current to a reference potential line via the low voltage operating unit; and a current bypass circuit that flows a part of the operating current flowing through the relay coupling line into the reference potential line without supplying the part of the operating current to the recycling circuit according to a voltage increase in the low power supply voltage applied to the low voltage operating unit.

Advantageous Effects of Invention

According to the display driving device of the present invention, the recycling circuit applies the low power supply voltage to the low voltage operating unit while supplying the operating current flowing through the high voltage operating unit to the reference potential line via the low voltage operating unit to effectively use the operating current of the high voltage operating unit, and thus an amount of electricity consumption can be reduced. According to the voltage increase in the low power supply voltage applied to the low voltage operating unit, a part of the operating current flowing through the relay coupling line is flowed into the reference potential line without being supplied to the recycling circuit, and therefore, a variation in the driving voltage can be reduced and an excessive increase in the applied voltage to the low voltage operating unit can be prevented.

DESCRIPTION OF PREFERRED EMBODIMENTS

The following describes embodiments of the present invention in detail with reference to the drawings.

Figure 1:
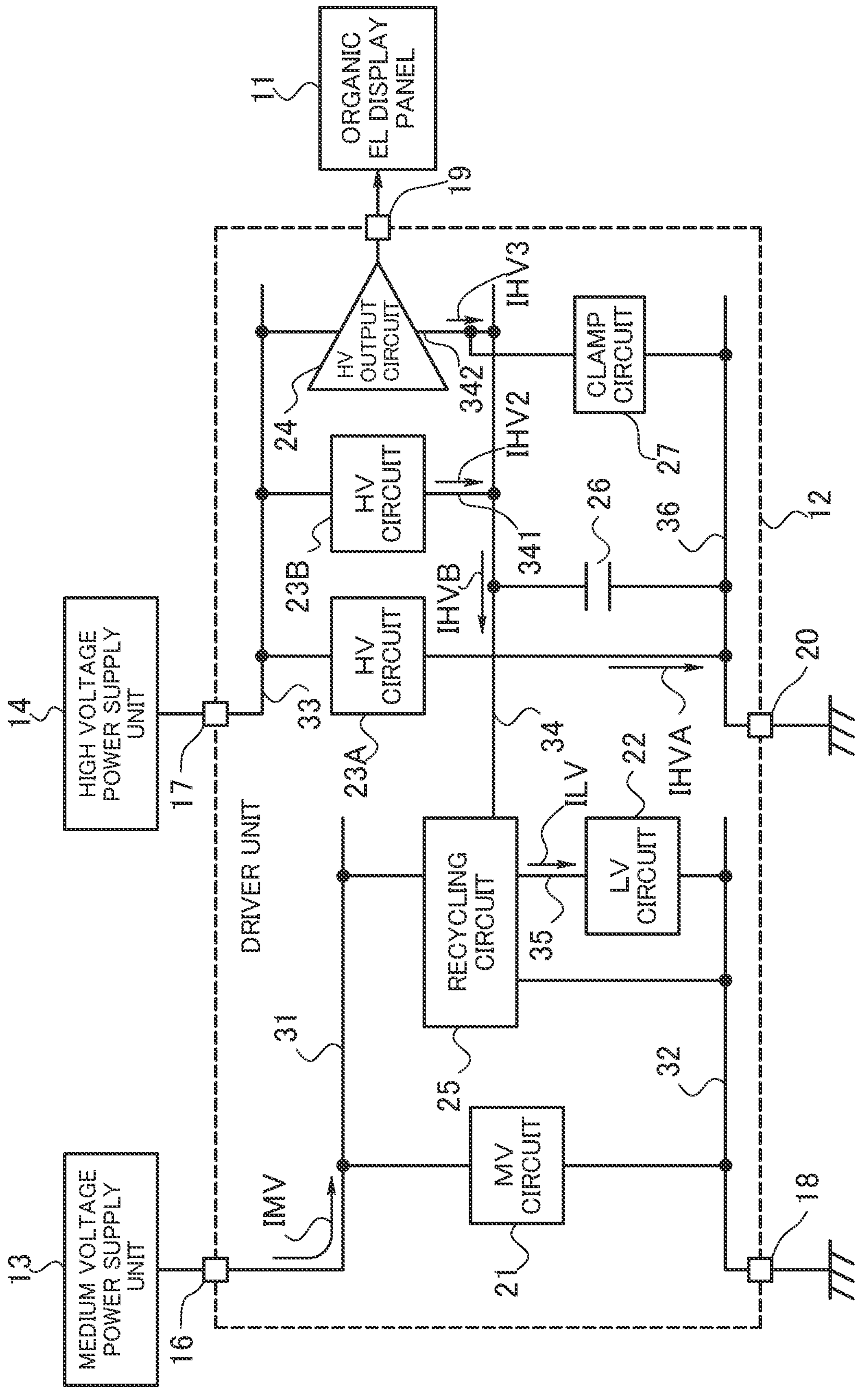
FIG. 1 is a block diagram illustrating a configuration of an organic EL display driving device as an embodiment of the present invention.

FIG. 1 illustrates a configuration of a display driving device as the embodiment of the present invention. FIG. 1 illustrates only a power supply line and a drive output line as wirings for circuits and omits a control line and a signal supply line between the circuits.

The driving device includes a driver unit 12 that drives an organic EL display panel 11 and a medium voltage power supply unit 13 and a high voltage power supply unit 14 that supply a power supply voltage to the driver unit 12.

For example, in the organic EL display panel 11, a plurality of organic EL elements are arranged in a matrix as respective pixels to configure a display panel. The medium voltage power supply unit 13 generates a medium voltage MV (a medium power supply voltage) as a power supply voltage, and the high voltage power supply unit 14 generates a high voltage HV (a high power supply voltage), which is a power supply voltage higher than the medium voltage MV.

Figure 5:
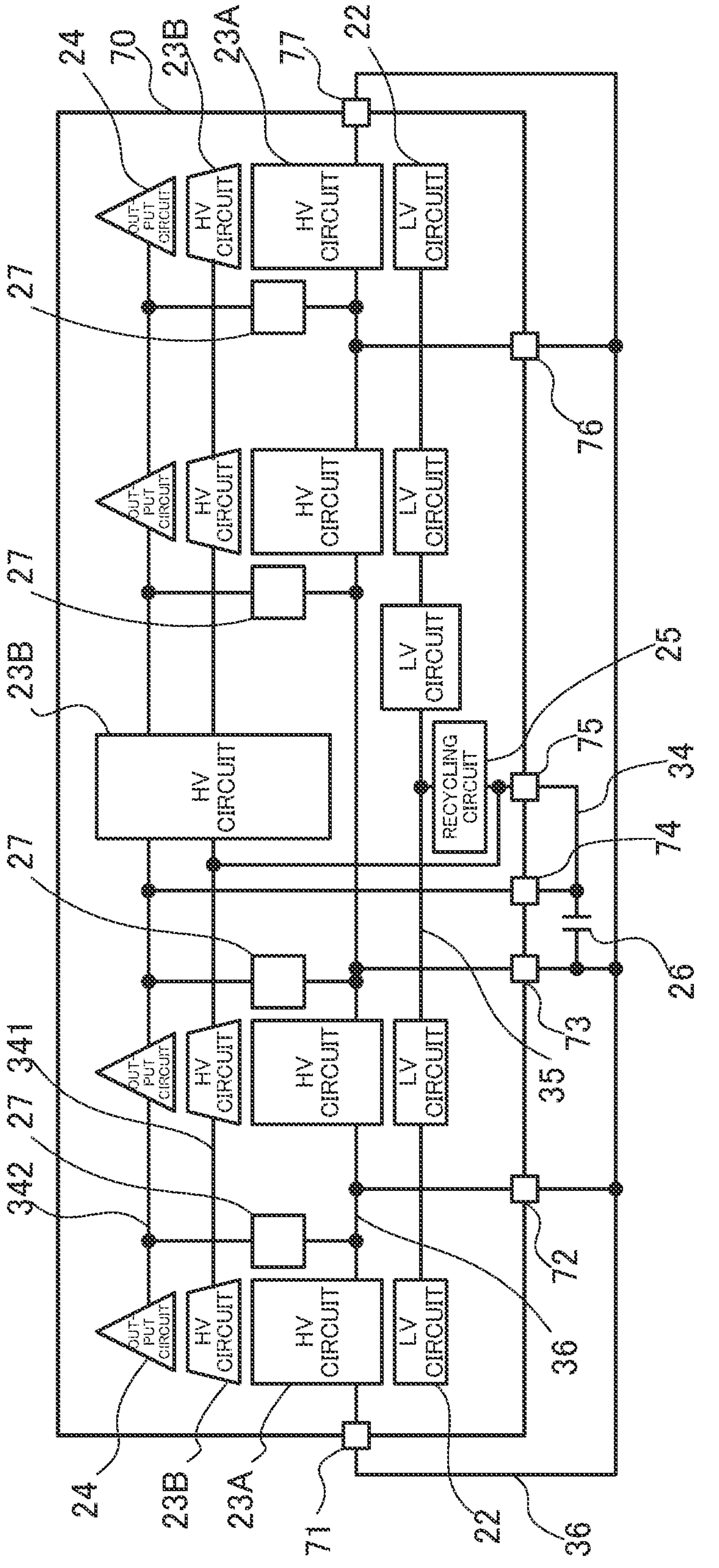
FIG. 5 illustrates an arrangement and a wiring example when circuits of the device in FIG. 1 are implemented as an IC chip.

The driver unit 12 includes a MV circuit 21 to which the medium voltage MV is applied as the power supply voltage, a LV circuit 22 (a low voltage operating unit) to which a low voltage LV (a low power supply voltage), which is a power supply voltage lower than the medium voltage MV, is applied, a HV circuit 23A, a HV circuit 23B, and a HV output circuit 24 as high voltage operating units to which the high voltage HV is applied as the power supply voltage, and a recycling circuit 25 that supplies the low voltage LV to the LV circuit 22. The LV circuit 22, the HV circuit 23A, the HV circuit 23B, and the HV output circuit 24 are disposed by a plurality of channels (a plurality of source lines) as illustrated in FIG. 5 when the driving device is implemented as an IC chip, but each one of them is illustrated in FIG. 1.

The MV circuit 21 is, for example, a part that generates luminance data of each pixel for each source line in the organic EL display panel 11 according to an input image signal, in response to the input image signal. The LV circuit 22 is a control circuit configured of a logic circuit that handles a stage prior to an output stage in the driver unit 12. In response to the input image signal input from the MV circuit 21, the LV circuit 22 controls the HV circuits 23A and 23B and the HV output circuit 24 based on a synchronization signal.

To the MV circuit 21 and the recycling circuit 25, respective voltage application line 31 and ground line 32 (a reference potential line) are individually coupled. The voltage application line 31 is an application line of the medium voltage MV coupled to an output end of the medium voltage power supply unit 13. The ground line 32 is a grounding line and is a grounding line of the medium voltage power supply unit 13. A current IMV generated by the medium voltage MV supplied via the voltage application line 31 flows into the MV circuit 21 and the recycling circuit 25 as an operating current, and the current IMV flows out to the ground line 32 from the circuits.

The HV circuit 23A is a logic circuit and a level shifter for HV circuit control and is a circuit that requires a voltage range from the ground level to the high voltage HV. To the HV circuit 23A, respective voltage application line 33 (first voltage application line) and ground line 36 (reference potential line) are coupled. The ground line 36 may be coupled to the ground line 32. A current IHVA generated by the high voltage HV supplied via the voltage application line 33 flows into the HV circuit 23A as an operating current, and the current IHVA flows out to the ground line 36 from the HV circuit 23A.

For example, the HV circuit 23B is a bias circuit, and the HV output circuit 24 is, for example, an output amplifier circuit. The HV circuit 23B and the HV output circuit 24 operate at an electric potential on the ground side of the low voltage LV or more, and are circuits to which the application of the electric potential at the high voltage HV is required or desirable.

A voltage application line 33 and a relay coupling line 34 are individually coupled to the HV circuit 23B and the HV output circuit 24. The relay coupling line 34 is coupled to the HV circuit 23B via a relay coupling line 341, and similarly is coupled to the HV output circuit 24 via a relay coupling line 342. The relay coupling line 341 is a line to couple the HV circuits 23B of a plurality of channels in common, and the relay coupling line 342 is a line to couple the HV output circuits 24 of a plurality of channels in common.

A current IHV2 generated by the high voltage HV supplied via the voltage application line 33 flows into the HV circuit 23B as an operating current, a current IHV3 generated by the high voltage HV supplied via the voltage application line 33 flows into the HV output circuit 24 as an operating current, and the currents IHV2 and IHV3 flow out to the relay coupling line 34 via the relay coupling lines 341 and 342 from the HV circuit 23B and the HV output circuit 24 as a resultant current IHVB. Further, a bypass capacitor 26 is coupled between the relay coupling line 34 and the ground line 36.

The relay coupling line 34 is coupled to the recycling circuit 25. A voltage application line 35 (a third voltage application line) is further coupled to the recycling circuit 25. The recycling circuit 25 receives the current IHVB supplied from the relay coupling line 34 to control such that a voltage of the voltage application line 35 becomes the low voltage LV equal to a reference voltage as will be described later. To the LV circuit 22, the voltage application line 35 and the ground line 32 are coupled. A current ILV flows into the LV circuit 22 from the recycling circuit 25 via the relay coupling line 35 as an operating current, and the current ILV flows out from the LV circuit 22 to the ground line 32.

A clamp circuit 27 is coupled between the relay coupling line 342 of the relay coupling line 34 and the ground line 36. The clamp circuit 27 is a current bypass circuit that flows a part of a current IHV3 flowing through the relay coupling line 342 into the ground line 36 without supplying it to the recycling circuit 25 according to the voltage increase of the low voltage LV applied to the LV circuit 22. The clamp circuit 27 is disposed in each channel, and the coupling position of the clamp circuit 27 to the relay coupling line 342 is in a vicinity of an output position of the current IHV3 from the HV output circuit 24.

Figure 2:
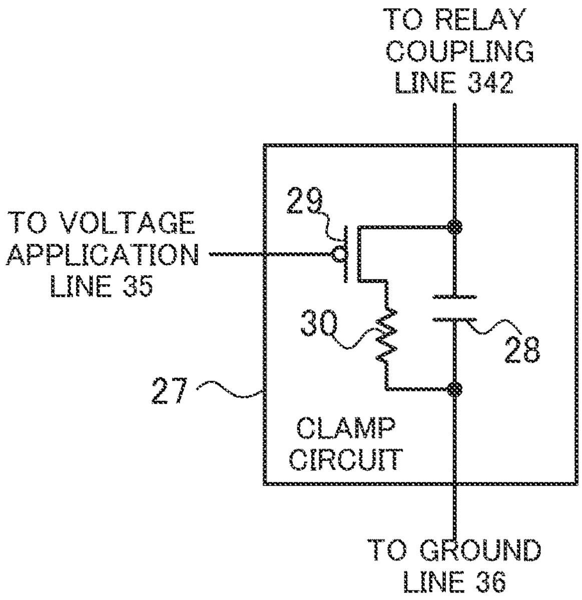
FIG. 2 is a circuit diagram illustrating a specific configuration of a clamp circuit in the device in FIG. 1.

As illustrated in FIG. 2, the clamp circuit 27 includes a bypass capacitor 28, a field effect transistor (PMOS FET) 29, and a resistor 30. The bypass capacitor 28 is coupled between the relay coupling line 342 and the ground line 36, a source of the transistor 29 is coupled to the relay coupling line 342, and a drain of the transistor 29 is coupled to the ground line 36 via the resistor 30. A gate of the transistor 29 is coupled to the voltage application line 35 from the recycling circuit 25 to the LV circuit 22.

All of the high voltage HV, the medium voltage MV, and the low voltage LV (the reference voltage) are positive voltages and have the relationship HV>MV>LV as described above. In this embodiment, HV=7 [V], MV=1.8 [V], and LV=1.2 [V].

Figure 3:
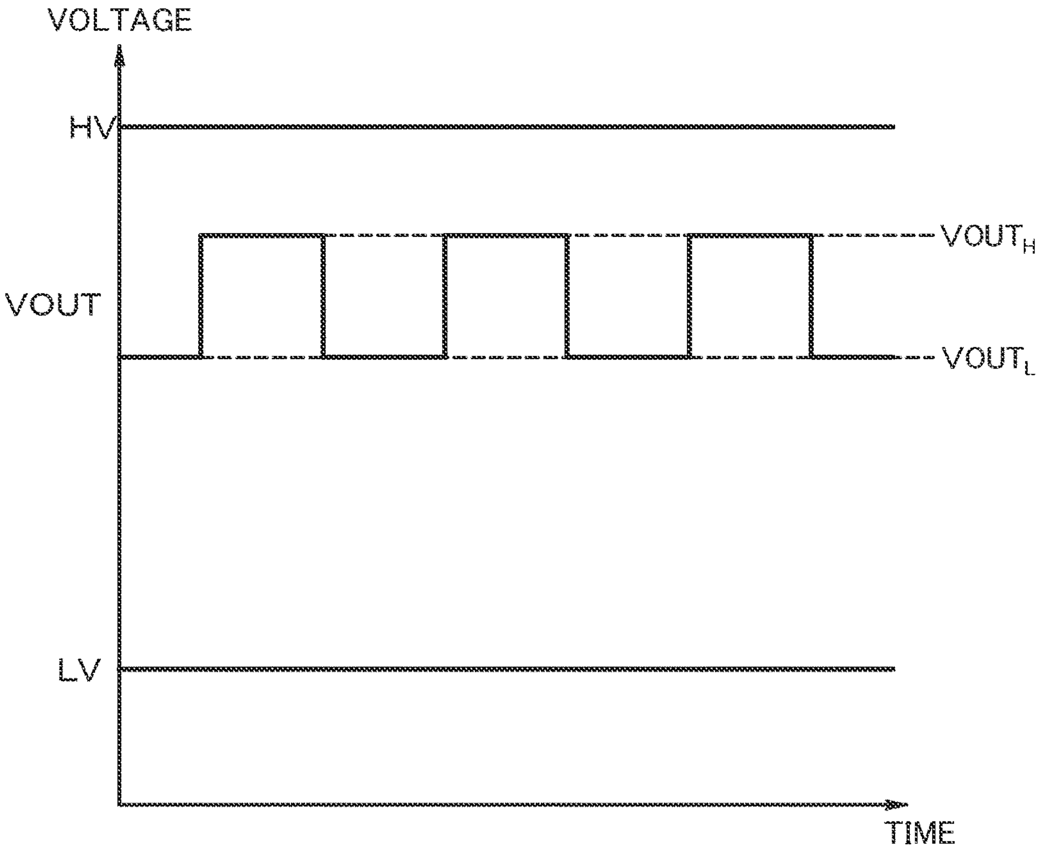
FIG. 3 is a drawing illustrating a voltage range of a driving voltage of the device in FIG. 1.

A driving voltage VOUT output from the HV output circuit 24 to the organic EL display panel 11 is a what is called a source driver output, and as illustrated in FIG. 3, is in a voltage range from a voltage $VOUT_L$ sufficiently higher than the low voltage LV, for example, 3 [V] or more, to a voltage $VOUT_H$ lower than the high voltage HV, for example, 5 [V] or less.

As illustrated in FIG. 1, the driver unit 12 includes external coupling terminals 16 to 20, and the above-described organic EL display panel 11, power supply units 13 and 14, and external ground are coupled via the external coupling terminals 16 to 19.

Figure 4:
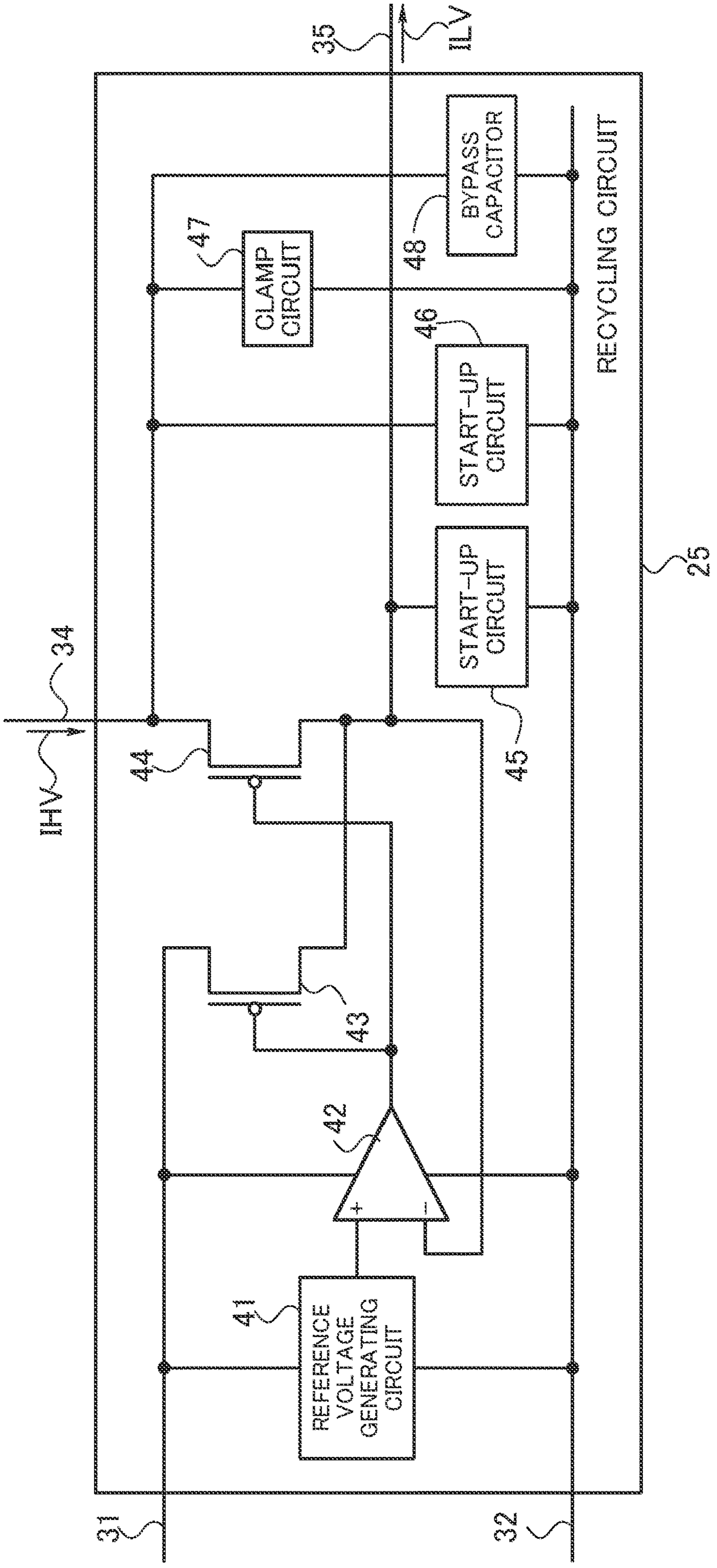
FIG. 4 is a circuit diagram illustrating a specific configuration of a recycling circuit in the device in FIG. 1.

As illustrated in FIG. 4, the recycling circuit 25 specifically includes a reference voltage generating circuit 41, an operational amplifier 42, first and second field effect transistors (PMOS FETs) 43 and 44, start-up circuits 45 and 46, a clamp circuit 47, and a bypass capacitor (a bypass condenser) 48.

The voltage application line 31 (the second voltage application line) and the ground line 32 are individually coupled to the respective reference voltage generating circuit 41 and operational amplifier 42, and the medium voltage MV is applied as a power supply voltage. The reference voltage generating circuit 41 is a reference voltage generating unit that generates the low voltage LV as the reference voltage based on the medium voltage MV. To obtain the low voltage LV from the medium voltage MV, the reference voltage generating circuit 41 includes, for example, a simple constant voltage circuit using a zener diode and a resistor or a voltage dividing circuit formed of series-coupled two resistors, and a voltage follower. The voltage follower in the reference voltage generating circuit 41 receives the low voltage LV supplied from the above-described constant voltage circuit or voltage dividing circuit as an input voltage, and outputs the low voltage LV at a low impedance.

The operational amplifier 42 is a driving unit that controls gate voltages of the respective field effect transistors 43 and 44. A positive input end of the operational amplifier 42 is coupled to an output end of the reference voltage generating circuit 41, and a negative input terminal is coupled to respective drains of the field effect transistors 43 and 44. An output end of the operational amplifier 42 is coupled to respective gates of the field effect transistors 43 and 44. A source of the field effect transistor 43 is coupled to the voltage application line 31. A source of the field effect transistor 44 is coupled to the relay coupling line 34. The respective drains of the field effect transistors 43 and 44 are coupled to the voltage application line 35.

The start-up circuit 45 is coupled to the voltage application line 35 and the ground line 32 and temporarily applies a start-up voltage SV1, which is approximately equal to the reference voltage of the low voltage LV, to the voltage application line 35 when the power is turned on. Although not illustrated, the start-up circuit 45 is coupled to the voltage application line 31, and, for example, generates the start-up voltage SV1 based on the medium voltage MV. After the power is turned on, the start-up voltage SV1 is generated for a period until the operation of the LV circuit 22 stabilizes.

The start-up circuit 46 is coupled to the relay coupling line 34 and the ground line 32, and temporarily applies a start-up voltage SV2 slightly higher than the medium voltage MV, for example, from 2.0 to 2.5 [V] to the relay coupling line 34 when the power is turned on. Although not illustrated, the start-up circuit 46 is coupled to the voltage application line 33 and, for example, steps down and generates the start-up voltage SV2 based on the high voltage HV. After the power is turned on, the start-up voltage SV2 is generated for a period until the operation of a HV circuit 23 stabilizes.

The clamp circuit 47 is disposed between the relay coupling line 34 and the ground line 32 to prevent the voltage of the relay coupling line 34 from excessively increasing to, for example, 3 [V] or more. The bypass capacitor 48 is a capacitor disposed between the relay coupling line 34 and the ground line 32 to prevent a ripple of the voltage of the relay coupling line 34.

FIG. 5 illustrates an arrangement and a wiring example when the circuits (excluding the MV circuit 21) of the driving device illustrated in FIG. 1 are implemented as an IC chip. As illustrated in FIG. 5, in an IC 70, the respective LV circuits 22, HV circuits 23A and 23B, and the HV output circuits 24 are dispersed in a plurality of channels and disposed. The LV circuits 22, which are dispersed and arranged, and the recycling circuit 25 are coupled to one another with the voltage application line 35. The HV circuits 23A in the respective channels are coupled to one another with the ground line 36. The ground line 36 is wired to the outside of the IC 70 via pads 71 to 73, 76, and 77. The HV circuits 23B in the respective channels are coupled to one another with the relay coupling line 341, and further coupled to the recycling circuit 25 and a pad 75. The HV output circuits 24 in the respective channels are coupled to one another with the relay coupling line 342 and further coupled to a pad 74. The pads 74 and 75 are coupled with the relay coupling line 34. The bypass capacitor 26 is externally coupled between the pads 73 and 74.

With the driving device according to the embodiment having the configuration, when both of the power supply units 13 and 14 start operating and the power supply voltage is supplied, first, the start-up circuits 45 and 46 immediately operate. Accordingly, the level of the voltage application line 35 increases up to the start-up voltage SV1, or the level of the relay coupling line 34 increases up to the start-up voltage SV2.

The reference voltage generating circuit 41 generates a reference voltage of the low voltage LV. The reference voltage is supplied to the positive input end of the operational amplifier 42, and the operational amplifier 42 compares it with a voltage of a negative input end. The operational amplifier 42 and the field effect transistor 43 operate as a voltage regulator. That is, since the field effect transistor 43 flows a current from the voltage application line 31 to the voltage application line 35 via between the source and the drain of the field effect transistor 43 such that the voltage of the positive input end becomes equal to the voltage of the negative input end. As a result, the voltage of the voltage application line 35 is stabilized to the low voltage LV equal to the reference voltage, and is applied to the LV circuit 22.

When the high voltage HV as the output voltage of the high voltage power supply unit 14 is applied to the HV circuits 23A and 23B and the HV output circuit 24 via the voltage application line 33, the respective HV circuits 23A and 23B and HV output circuit 24 operate. The operating current IHVA of the HV circuit 23A flows out to the ground line 36. On the other hand, the operating currents IHV2 and IHV3 of the HV circuit 23B and the HV output circuit 24 flow through the relay coupling lines 341 and 342, respectively, join together at the relay coupling line 34, and turn into the current IHVB, and the current IHVB flows into the recycling circuit 25. In the recycling circuit 25, the current IHVB flows out to the voltage application line 35 via between the source and the drain of the field effect transistor 44. The voltage of the voltage application line 35 is stabilized to the low voltage LV equal to the reference voltage and applied to the LV circuit 22. Accordingly, the resultant current of a part of the current IMV and the current IHVB flows through the LV circuit 22 as the current ILV. IHVB=IHV−IHVA.

Since the field effect transistor 44 performs the on/off operation according to an output voltage of the operational amplifier 42 together with the field effect transistor 43, the flowing of the operating current IHVB of the HV circuit 23B and the HV output circuit 24 into the voltage application line 35 is controlled between the source and the drain of the field effect transistor 44 such that the voltage of the voltage application line 35 is stabilized to the low voltage LV equal to the reference voltage. Since a voltage Vds between the source and the drain of the field effect transistor 44 is determined by the current flowing through between the source and the drain of the field effect transistor 44 and the gate potential of the field effect transistor 44, the electric potential of the relay coupling line 34 is determined by the voltage.

Depending on a balance between the current IHVB and the current ILV, there is a possibility that the current flows in both directions between the voltage application line 31 and the relay coupling line 34 via the field effect transistors 43 and 44, and therefore a size ratio of the field effect transistors 43 and 44 is set so as to prevent it, and the currents flowing through the respective field effect transistors 43 and 44 are optimized.

A consumed power A of the driving device according to the embodiment illustrated in FIG. 1 can be calculated as follows.

$$\text{Consumed power } A = \text{medium voltage MV} \times (\text{current IMV} - \text{current IHVB}) + \text{high voltage HV} \times \text{current IHVA} + \text{high voltage HV} \times \text{current IHVB} \quad (1)$$

Figure 6:
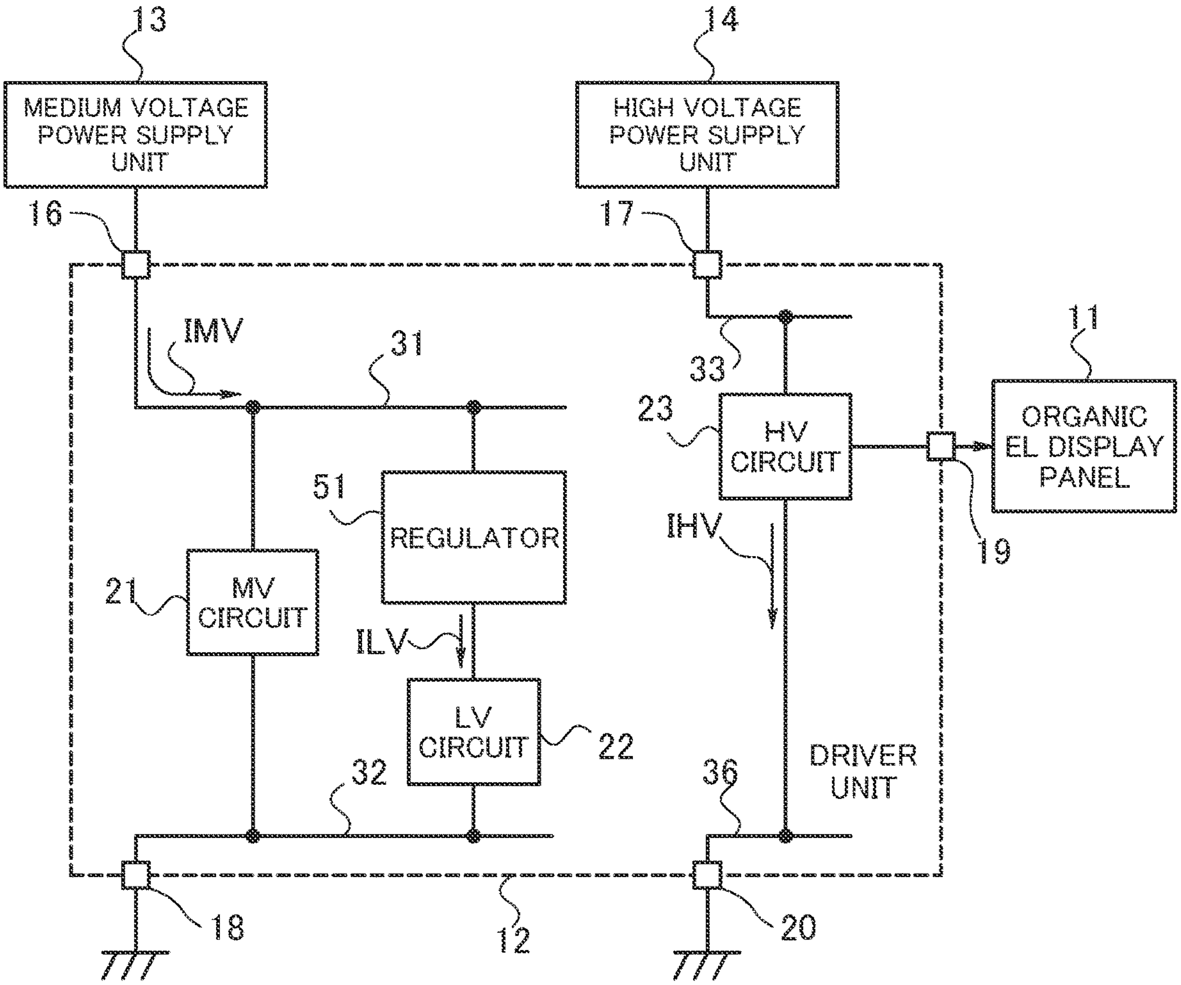
FIG. 6 is a block diagram illustrating an example of a driving device for comparison of consumed power with the device in FIG. 1.

For comparison with this consumed power A, FIG. 6 illustrates an example of a driving device that uses a low voltage that has been stepped down and generated by the regulator as described in the above-described JP-A-2007-122156 without using the recycling circuit 25 as included in the embodiment. The driving device illustrated in FIG. 6 includes a regulator 51 that converts the medium voltage MV as the output voltage of the medium voltage power supply unit 13 into the low voltage LV. While the low voltage LV as the output voltage of the regulator 51 is applied to the LV circuit 22, the high voltage HV as the output voltage of the high voltage power supply unit 14 is applied to the HV circuit 23 as is, and the operating current IHV flows out from the HV circuit 23 via the ground line 36. The HV circuit 23 is a circuit including the above-described HV circuits 23A and 23B and the HV output circuit 24. The ground line 36 is coupled to the grounded external coupling terminal 20.

A consumed power B of the driving device illustrated in FIG. 6 can be calculated as follows.

$$\text{Consumed power } B = \text{medium voltage MV} \times \text{current IMV} + \text{high voltage HV} \times \text{current IHV} \quad (2)$$

Assume that the current IMV is 40 [mA] and the current IHV is 35 [mA], as described above, since HV=7 [V], MV=1.8 [V], and LV=1.2 [V], using Formula (2), the consumed power B becomes:

$$\text{Consumed power } B = 1.8\ [\text{V}] \times 40\ [\text{mA}] + 7\ [\text{V}] \times 35\ [\text{mA}] = 317\ [\text{mW}]$$

On the other hand, assuming that the current IHVA flowing through the HV circuit 23A is 5 [mA], the resultant current IHVB of the currents IHV2 and IHV3 flowing through the HV circuit 23B and the HV output circuit 24 is 30 [mA], and as described above, HV=7 [V] and MV=1.8 [V], when the other voltage value and current value are equal to the values in the calculation of the above-described consumed power B, the consumed power A calculated using Formula (1) becomes:

$$\text{Consumed power } A = 1.8\ [\text{V}] \times (40\ [\text{mA}] - 30\ [\text{mA}]) + 7\ [\text{V}] \times 5\ [\text{mA}] + 7\ [\text{V}] \times 30\ [\text{mA}] = 263\ [\text{mW}]$$

It is seen that the consumed power A of the driving device according to the embodiment illustrated in FIG. 1 lowers around 17% than the consumed power B of the example of the driving device in FIG. 6. Thus, the operating current IHVA is flowed through the ground line 36 such that the high voltage HV in the voltage level range from the level of 0 [V] can be obtained in the HV circuit 23A, and the current IHVB that flows through the HV circuit 23B and the HV output circuit 24 that do not require the level of 0 [V] is recycled in the LV circuit 22, and therefore the consumed power of the driving device can be reduced.

In a case where the operations of the HV circuit 23B and the HV output circuit 24 change the current IHVB, the voltage of the relay coupling line 34 also varies. The clamp circuit 47 suppresses the voltage variation of the relay coupling line 34. The bypass capacitor 48 reduces a ripple voltage of the relay coupling line 34.

Figure 7:
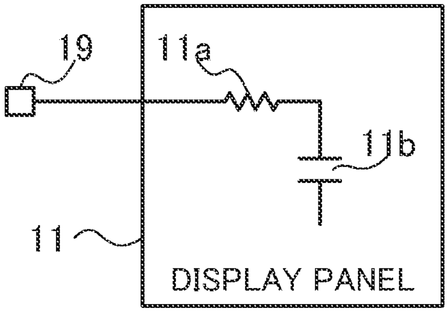
FIG. 7 is a drawing illustrating an equivalent circuit of an organic EL display panel coupled to the device in FIG. 1.

When the output of the HV output circuit 24 significantly varies especially, as equivalently illustrated in FIG. 7, since the organic EL display panel 11 includes a resistor 11*a* and a capacitor 11*b*, a charge/discharge current having a large peak by the resistor 11*a* and the capacitor 11*b* flows through the HV output circuit 24. The current and a parasitic resistance of the relay coupling line 342 temporarily increase the electric potential of the relay coupling line 342. While the increased electric potential causes a flow through the bypass capacitor 48 as a part of the current IHV3 and charges the bypass capacitor 48, an electric charge of the bypass capacitor 48 is discharged by the current consumption ILV of the LV circuit 22. However, when the consumption current ILV of the LV circuit 22 excessively increases caused by the charge/discharge current, the voltage of the relay coupling line 342 excessively increases, and the voltage is applied to the source of the field effect transistor 29. In view of this, a voltage Vgs between the gate and the source of the field effect transistor 29 increases to turn on the field effect transistor 29. Accordingly, a part of the current IHV3 flows into the ground line 36 via between the source and the drain of the field effect transistor 29 and the resistor 30. That is, an excessive amount of the current of the current IHV3 escapes to the ground line 36. Consequently, the excessive increase in the voltage of the relay coupling line 342 is suppressed.

The gate voltage of the field effect transistor 29 and its transistor size are determined by how much the electric potential increase in the relay coupling line 342 is reduced. In the embodiment, for example, a voltage higher than the low voltage LV by a gate threshold voltage Vt of the field effect transistor 29 is set.

Note that the resistor 30 restricts the current flowing through the field effect transistor 29 at the above-described increase in the electric potential of the relay coupling line 342, ESD surge, or the like to prevent the field effect transistor 29 from breaking.

Figure 8:
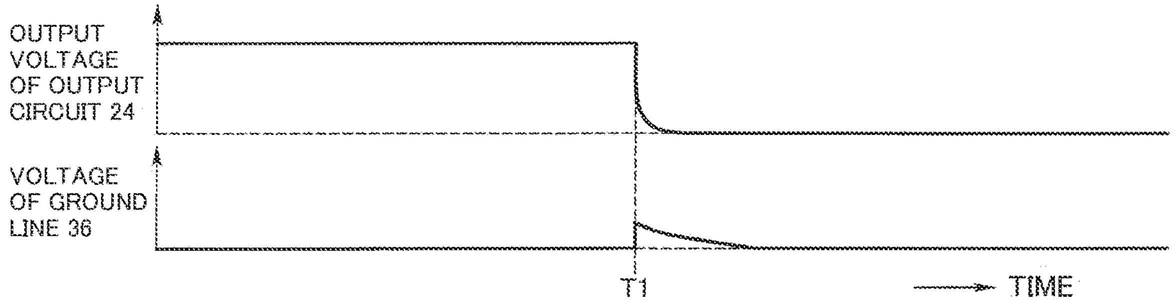
FIG. 8 is a simulation diagram illustrating a voltage change in a ground line when a driving voltage of the driving device in FIG. 6 decreases.

FIG. 8 illustrates a voltage change in the ground line 36 in a case where the driving voltage VOUT of the driving device illustrated in FIG. 6 largely decreases due to a change in a gradation voltage at a time point T1. In the driving device in FIG. 6 that does not include the recycling circuit 25, due to an increase in the current flowing through the ground line 36 at the time point T1, the voltage level of the ground line 36 increases, and afterwards gradually decreases.

Figure 9:
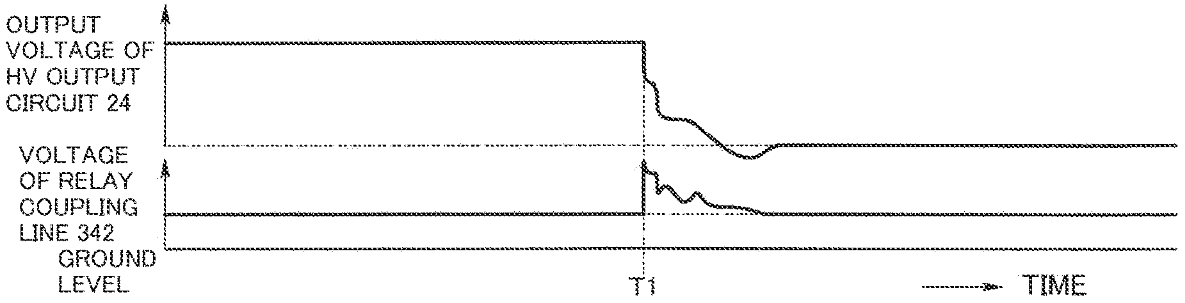
FIG. 9 is a simulation diagram illustrating a voltage change in a ground line when a driving voltage decreases in a configuration that does not include a clamp circuit in a vicinity of a HV output circuit of the driving device in FIG. 1.

FIG. 9 illustrates a voltage change in the relay coupling line 342 with respect to the voltage change in the driving voltage VOUT in a case where the clamp circuit 27 is not disposed and only the clamp circuit 47 in the recycling circuit 25 acts in the driving device illustrated in FIG. 1. When the driving voltage VOUT largely decreases due to the change in the gradation voltage at the time point T1, the voltage of the relay coupling line 342 largely increases, and as a result, the voltage increase destabilizes the driving voltage VOUT immediately after the voltage drop of the driving voltage VOUT.

Figure 10:
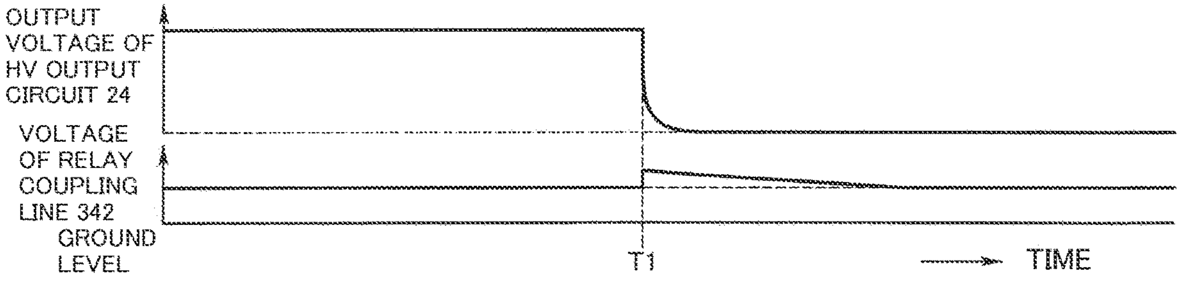
FIG. 10 is a simulation diagram illustrating a voltage change in a ground line when a driving voltage decreases in a configuration that includes the clamp circuit in a vicinity of the HV output circuit as in the driving device in FIG. 1.

FIG. 10 illustrates a voltage change in the relay coupling line 342 with respect to a voltage change in the driving voltage VOUT in a case where the clamp circuit 27 is disposed in each HV output circuit 24 as illustrated in FIG. 5 in the driving device illustrated in FIG. 1. When the driving voltage VOUT largely decreases due to the change in the gradation voltage at the time point T1, the clamp circuit 27 directly flows an extra amount of current in the current IHV3 to the ground line 36 to reduce the voltage increase in the relay coupling line 342. Therefore, the voltage increase in the relay coupling line 342 is lower than the voltage increase in FIG. 9, and the driving voltage VOUT can be immediately stabilized at immediately after the voltage drop of the driving voltage VOUT. This allows preventing the excessive increase in the low voltage LV.

In the respective embodiments described above, the example of the driving device that drives the organic EL display panel as the display panel is described, but the present invention is not limited to this. The present invention is also applicable to a display driving device that drives another display panel and operates then by application of power supply voltages of a plurality of different voltage levels.

DESCRIPTION OF REFERENCE SIGNS

11 Organic EL display panel
12 Drive unit
13, 14 Power supply unit
16 to 20 External coupling terminal
21 MV circuit
22 LV circuit
23, 23A, 23B HV circuit
24 HV output circuit
25 Recycling circuit
26, 28, 48 Bypass capacitor
27, 47 Clamp circuit
29, 43,44 Field effect transistor
30 Resistor
41 Reference voltage generating circuit
42 Operational amplifier
45, 46 Start-up circuit
51 Regulator
70 IC
71 to 77 Pad

The invention claimed is:

1. A display driving device for driving a display panel, comprising:

a high voltage operating unit that includes an output circuit to supply a driving voltage to the display panel, the high voltage operating unit being coupled to a first voltage application line to which a high power supply voltage is applied, the high voltage operating unit obtaining an operating current according to the application of the high power supply voltage from the first voltage application line;

a low voltage operating unit that operates according to an application of a low power supply voltage lower than the high power supply voltage to control the high voltage operating unit;

a recycling circuit that receives the operating current from the high voltage operating unit via a relay coupling line, the recycling circuit applying the low power supply voltage to the low voltage operating unit while supplying the received operating current to a reference potential line via the low voltage operating unit; and a current bypass circuit that flows a part of the operating current flowing from the high voltage operation unit through the relay coupling line into the reference potential line without supplying the part of the operating current to the recycling circuit according to a voltage increase in the low power supply voltage applied to the low voltage operating unit, wherein the current bypass circuit is configured of a clamp circuit that includes:

a field effect transistor having a gate that receives a voltage applied to the low voltage operating unit as the low power supply voltage;

a resistor having one end coupled to a drain of the field effect transistor; and a bypass capacitor having one end coupled to the relay coupling line together with a source of the field effect transistor, the bypass capacitor having another end coupled to the reference potential line together with another end of the resistor.

2. The display driving device according to claim 1, wherein the current bypass circuit is coupled between a vicinity of a coupling point of the relay coupling line with the output circuit and the reference potential line.

3. The display driving device according to claim 1, wherein the display panel is an organic EL display panel.

4. The display driving device according to claim 1, wherein the driving voltage is a voltage having a variation range lower than the high power supply voltage and higher than the low power supply voltage.

5. The display driving device according to claim 1, wherein a part of the high voltage operating unit excluding the output circuit supplies the operating current to a reference potential line side without via the low voltage operating unit.

6. A display driving device for driving a display panel, comprising:

a high voltage operating unit that includes an output circuit to supply a driving voltage to the display panel, the high voltage operating unit being coupled to a first voltage application line to which a high power supply voltage is applied, the high voltage operating unit obtaining an operating current according to the application of the high power supply voltage from the first voltage application line;

a low voltage operating unit that operates according to an application of a low power supply voltage lower than the high power supply voltage to control the high voltage operating unit;

a recycling circuit that receives the operating current from the high voltage operating unit via a relay coupling line, the recycling circuit applying the low power supply voltage to the low voltage operating unit while supplying the received operating current to a reference potential line via the low voltage operating unit;

a current bypass circuit that flows a part of the operating current flowing from the high voltage operation unit through the relay coupling line into the reference potential line without supplying the part of the operating current to the recycling circuit according to a voltage increase in the low power supply voltage applied to the low voltage operating unit;

a second voltage application line to which a medium power supply voltage lower than the high power supply voltage and higher than the low power supply voltage is applied; and a third voltage application line that couples the recycling circuit to the low voltage operating unit to apply the low power supply voltage to the low voltage operating unit, wherein the recycling circuit includes:

a reference voltage generating unit that generates a reference voltage of the low power supply voltage;

a first field effect transistor having a source coupled to the second voltage application line and a drain coupled to the third voltage application line;

a second field effect transistor having a source coupled to the relay coupling line and a drain coupled to the third voltage application line; and a driving unit that controls a gate voltage of each of the first field effect transistor and the second field effect transistor such that a voltage of the third voltage application line is equal to the reference voltage.

* * * * *